Mar. 20, 1923.
E. P. HECKEL
1,449,115
METHOD OF AND APPARATUS FOR REGULATING DRIERS
Filed July 23, 1919
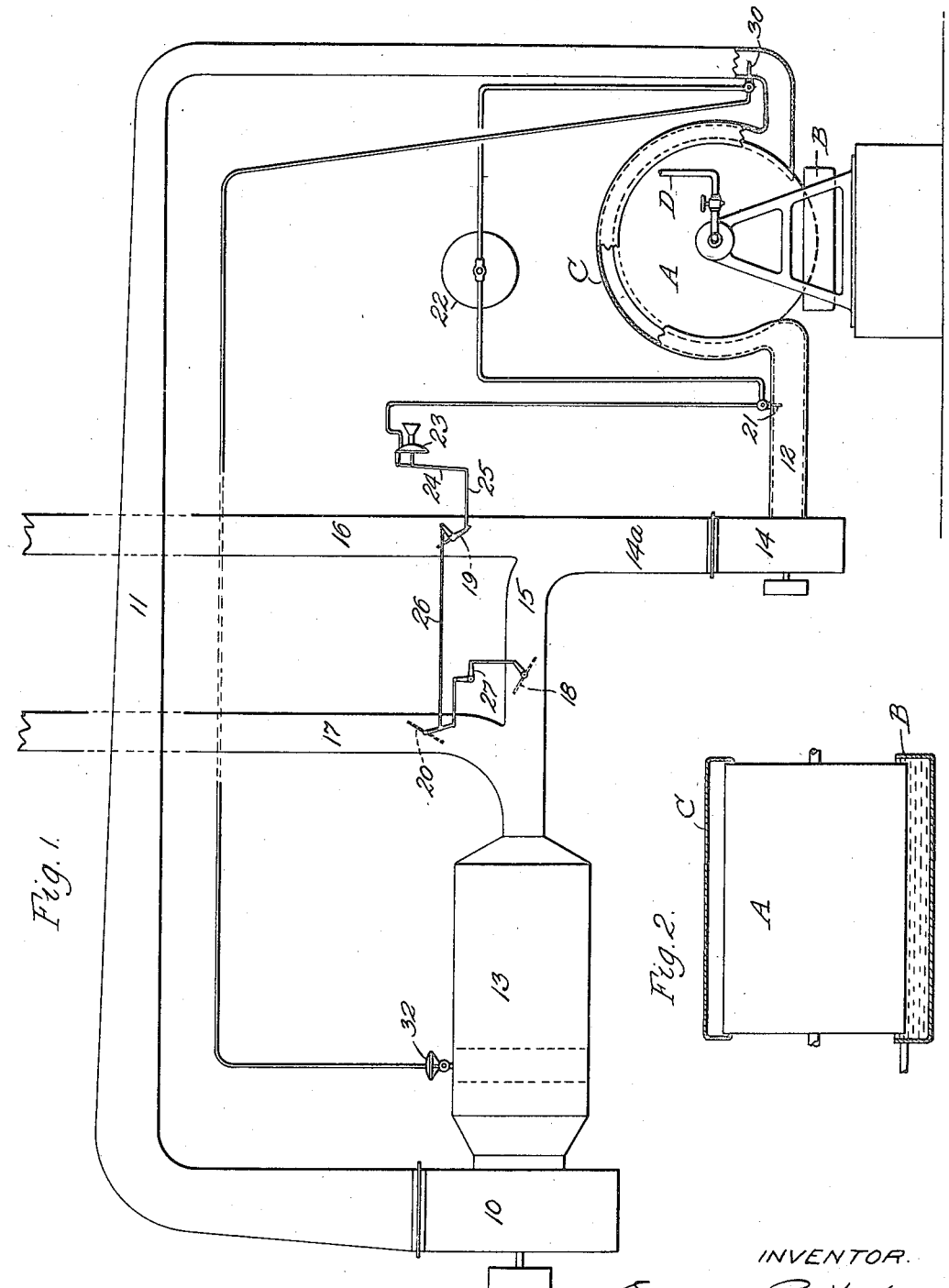
INVENTOR.
Edmund P. Heckel.
By Parker & Prochund
ATTORNEYS.

Patented Mar. 20, 1923.

1,449,115

UNITED STATES PATENT OFFICE.

EDMUND P. HECKEL, OF CHICAGO, ILLINOIS, ASSIGNOR TO CARRIER ENGINEERING CORPORATION, OF NEW YORK, N. Y.

METHOD OF AND APPARATUS FOR REGULATING DRIERS.

Application filed July 23, 1919. Serial No. 312,870.

*To all whom it may concern:*

Be it known that I, EDMUND P. HECKEL, a citizen of the United States, residing at Chicago, in the county of Cook and State of Illinois, have invented a new and useful Improvement in Methods of and Apparatus for Regulating Driers, of which the following is a specification.

This invention relates to a method of and apparatus for regulating the drying action of driers and controlling the moisture content of the dried material. The invention is herein illustrated and described in connection with a liquid drier of the revolving drum type in which moisture is evaporated from liquid applied in a thin film on the surface of the revolving drum. The invention, however, is not necessarily restricted to driers of this type but is applicable also to other types of driers.

The object of the invention is to produce a practical method and apparatus for regulating the evaporation of moisture from materials in and the work done by driers, particularly of the revolving drum or traveling surface type, so as to increase the efficiency of the driers and control the moisture content of the dried material, as may be desired.

In the operation of the revolving drum or surface driers for drying or evaporating liquids, such for example as milk or chemicals, the speed of revolution of the drum, and the temperature within the drum, and the amount of liquid on the surface of the drum, whether it is picked up by revolving the drum in a pan of liquid, is sprayed onto the surface of the drum or is otherwise applied, are usually maintained at definite fixed points, depending upon the nature of the material being dried, as is also the volume of the drying air delivered to the inlet end of the hood or enclosure for the drying surface. These factors being substantially constant, if a drop or depression is maintained between the temperatures of the air entering and leaving the drier hood, a constant definite amount of work will be done in the evaporation of moisture from the material and the dried material taken from the surface of the drier will have a definite moisture content. In accordance with this invention the condition of the air supplied to the drier is regulated for this purpose, preferably under the control of thermostats affected by the temperatures of the air entering and leaving the drier, in such a manner as to maintain a substantially constant temperature drop or depression of the air in the drier, in amount depending upon the nature of the material being treated.

The method will be hereinafter more fully explained in connection with the operation of the apparatus for performing the method.

In the accompanying drawings:

Fig. 1 is a diagrammatic plan elevation, partly in section, of an apparatus embodying the invention.

Fig. 2 is a sectional elevation of the drying drum and hood.

A represents a revolving drum which is heated in the usual way by hot water circulation or by steam admitted to the drum. In the drier shown the surface of the drum travels through a pan B which contains the liquid to be dried so that the surface of the drum picks up the liquid or is coated with a thin film of the liquid. C represents a hood which partially encloses the drying surface of the drum and through which air is circulated for evaporating moisture from the material on the surface of the drum. The drum is heated by water or steam supplied by the pipe D. The invention, however, does not relate to the construction of the drier and it can be of any suitable construction, and the drum may be heated and the liquid supplied to its surface in any usual or suitable way. In fact the invention is applicable also to driers of other than the revolving drum type.

10 represents a supply fan which is connected by a pipe or conduit 11 with the inlet end of the drier hood C for delivering air to the hood. This fan delivers a substantially constant volume of air to the drier. The air after passing through the hood and evaporating moisture from the material on the drying surface discharges from the hood through a pipe or conduit 12. The air supplied to the drier by the fan 10 is heated by a heater 13 of any suitable construction through which preferably the supply fan 10 draws the air which is delivered to the drier. The apparatus shown is designed so that the supply fan 10 can deliver to the drier either return air exhauster from the drier, fresh outside air, or a properly proportioned mixture of fresh and return air, as may be required to obtain the required rate of evaporation from the material being dried. For this purpose the following construction is preferably employed. The exit pipe 12 of the drier hood is preferably connected to the inlet of an exhaust fan 14, the discharge pipe 14ª of which has branches 15 and 16, one for returning the exhaust air from the drier to the heater 14 and the other for discharging the exhaust air into the room or into the atmosphere. An inlet or pipe 17 is also provided for admitting fresh or outside air to the heater 13 and supply fan 10. The return air pipe 15, air exhaust pipe 16 and fresh air inlet pipe 17 are controlled by suitable dampers 18, 19 and 20 respectively, which are adapted to be actuated under the control of a thermostat 21 influenced by the exhaust air from the drier hood, so as to move the dampers to cause either return air, fresh air or a suitably proportioned mixture of fresh and return air to be supplied to the drier hood, depending upon the temperature of the air exhausting from the hood. The thermostat 21 may be of any usual or suitable type and can be operatively connected to the dampers in any suitable way for actuating them. As shown, this thermostat controls the passage of compressed air from a reservoir or other source 22 to a diaphragm or motor 23, the movable element of which is connected by a lever 24 and link 25 to the damper 19. The shaft of this damper is connected by a link 26 and rock arms to the shaft of the damper 20 and this latter shaft is connected by a bell crank lever 27, links and rock arms to the remaining damper 18. The connections are such that when compressed air is admitted to the diaphragm or motor 23, the exhaust damper 19 and fresh air inlet damper 20 will be opened more or less and the return air damper 18 will be correspondingly closed more or less.

30 represents a thermostat which is arranged in the air supply 11, or is otherwise disposed so as to be influenced by the temperature of the air delivered to the drier hood. This thermostat, which may be of any suitable construction is operatively connected in any suitable manner to the heater 13 by which the air supplied to the drier hood is heated. As shown, the thermostat controls the passage of compressed air from the reservoir 22 to a diaphragm valve 32 which controls the supply of steam to the steam coils of the air heater 13. The thermostat could be operatively connected in any suitable way to any other suitable means adapted to control the temperature of the air supplied to the drier hood.

In the operation of the drier the thermostat 30 is set to maintain a substantially constant temperature of the air entering the drier hood, this temperature depending upon the nature of the material being dried and the results desired. For example, the apparatus is designed so that this thermostat can be set to maintain any desired temperature throughout a range of from 100° F. more or less to 350° F. more or less. The other thermostat 21 which responds to changes of temperature in the air leaving the drier hood is set for a definite temperature lower than the temperature of the air entering the hood so as to maintain a definite temperature drop or depression between the air entering and that leaving the hood. The amount of this depression will depend upon the nature of the material being dried and the desired moisture content of the dried material. This thermostat, may for example, maintain a fixed depression below the temperature of the air entering the hood through a range of from 1° F. or more to 50° F. more or less. When the thermostats have been set to maintain the desired temperatures of the air entering and leaving the hood, if the temperature of the effluent air increases above the degree for which the thermostat 21 is set, this thermostat will cause the exhaust and fresh air dampers 19 and 20 to open more or less and the return air damper 18 to close correspondingly. In such case, more or less of the moisture-ladened air from the hood will be exhausted into the atmosphere, and a corresponding amount of fresh air admitted to the heater 13 and the supply fan 10. This will result in decreasing the relative humidity of the air supplied to the drier hood and increase the evaporation and temperature depression between the air entering and leaving the hood. On the other hand, if the evaporation in the dried is too rapid and the temperature of the effluent air decreases below the desired depression point for which the thermostat 21 is set, this thermostat will operate to close more or less the exhaust and fresh air inlet dampers 19 and 20 and correspondingly open the return air damper 18 so that a greater quantity of moisture-ladened air exhausting from the hood will be returned by the fan 10 to the hood and thereby increase the relative humidity of the air in the hood and lessen the rate of evaporation of moisture from the material in the drier. In this way the temperature depression between the air entering and leaving the hood will be maintained substantially constant. Therefore, the quantity of liquid supplied to the drying surface, the speed of revolution of the drum, the temperature of the drum and the volume of the air supplied to the hood being all maintained substantially constant, the rate of evaporation and work done by the drier, and the moisture content of the dried material will be maintained substantially uniform and in accordance with the results desired and determined by the setting of the thermostats 30 and 21.

Different desired definite rates of evaporation and different definite moisture contents of the dried material can be obtained by different settings of the thermostats to give appropriate temperature depressions between the entering and leaving air.

The second or exhaust fan 14 eliminates air leakage from the drier hood to the surrounding atmosphere and maintains a constant pressure in the hood and, on account of the elimination of the heat, due to the air escaping from the hood, maintains a more comfortable condition for the operatives in the drier room. This exhaust fan is, therefore, preferably employed, but it is not essential to the operation of the apparatus and method which will give practical results with only the one supply fan 10. In such case the control of the exhaust air, fresh air admission and return air is the same as when using the second fan, as above described.

I claim as my invention:

1. The hereindescribed method of controlling the action of driers, comprising passing air through the drier to evaporate moisture from material therein, maintaining the air entering the drier at a substantially constant temperature, and regulating the condition of the air supplied to the drier so as to maintain a substantially fixed drop in temperature between the air entering and the air leaving the drier.

2. The hereindescribed method of controlling the action of driers, comprising passing air through the drier to evaporate moisture from material therein, maintaining the air entering the drier at a substantially constant temperature and regulating the condition of the air supplied to the drier under the control of the temperature of the air leaving the drier so as to maintain a substantially fixed drop in temperature between the air entering and the air leaving the drier.

3. The hereindescribed method of controlling the action of driers, comprising passing air through the drier to evaporate moisture from the material therein, maintaining the air entering the drier at a substantially constant temperature and regulating the humidity of the air entering the drier under the control of the dry bulb temperature of the air leaving the drier so as to maintain a substantially fixed drop in temperature between the air entering and the air leaving the drier.

4. The hereindescribed method of controlling the action of driers, comprising supplying to the drier a substantially constant volume of air of substantially fixed temperature, and regulating the humidity of such air so as to maintain a substantially fixed drop in temperature between the air entering and the air leaving the drier, by causing the air supplied to the drier to be fresh air, return air from the drier or a mixture of fresh and return air.

5. The hereindescribed method of controlling the action of driers, comprising supplying to the drier a substantially constant volume of air of substantially fixed temperature, and regulating the humidity of such air under the control of the dry bulb temperature of the air leaving the drier so as to maintain a substantially fixed drop in temperature between the air entering and the air leaving the drier, by causing the air supplied to the drier to be fresh air, return air from the drier or a mixture of fresh and return air.

6. The hereindescribed method of controlling the action of driers, comprising passing air through the drier to evaporate moisture from the material therein, heating the air supplied to the drier under the control of the temperature of the air entering the drier to maintain a substantially constant temperature of such entering air, and regulating the humidity of the air supplied to the drier so as to maintain a substantially fixed drop in temperature between the air entering and the air leaving the drier, by causing the air supplied to the drier to be fresh air, return air from the drier, or a mixture of fresh and return air.

7. The combination with a drier, of means for supplying air to and exhausting air from the drier, means for maintaining a substantially constant temperature of the air supplied to the drier, a thermostat which responds to changes in temperature of the air leaving the drier, and means controlled by said thermostat for regulating the humidity of the air supplied to the drier and maintaining a substantially fixed drop in temperature between the air entering and leaving the drier.

8. The combination with a drier, of an air circulating system for supplying air to the drier and exhausting air from and returning air to the drier, means for the escape of air from and the admission of fresh air to said circulating system, means for maintaining a substantially constant temperature of the air entering the drier, and a thermostat which responds to changes in temperature of the air leaving the drier and controls said air escape and fresh air admission means for regulating the humidity of the air entering the drier and maintaining a substantially fixed drop in temperature between the air entering and leaving the drier.

9. The combination with a traveling surface liquid drier in which the rate of travel, the supply of liquid to the surface and the temperature are substantially constant, of means for supplying air to and exhausting air from the drier, means for maintaining a substantially constant temperature of the air supplied to the drier, a thermostat which responds to changes in temperature of the air leaving the drier, and means controlled by said thermostat for regulating the humidity of the air supplied to the drier and thereby maintaining a substantially fixed drop in temperature between the air entering and leaving the drier.

10. The combination with a traveling surface liquid drier in which the rate of travel, the supply of liquid to the surface and the temperature are substantially constant, of an air circulating system for supplying air to the drier and exhausting the air from and returning air to the drier, means for the escape of air from and the admission of fresh air to said circulating system, means for maintaining a substantially constant temperature of the air entering the drier, and a thermostat which responds to changes in temperature of the air leaving the drier and controls said air escape and fresh air admission means for regulating the humidity of the air entering the drier and maintaining a substantially fixed drop in temperature between the air entering and leaving the drier.

11. The combination with a drier, of a fan for supplying air to the drier, air conducting means connecting the air exit of the drier to the inlet of the fan whereby air leaving the drier can be returned to the drier, a heater for the air, means for the escape of air from and the admission of fresh air to said air conducting means, a thermostat controlling said heater for maintaining a substantially constant temperature of the air entering the drier, and a thermostat which responds to changes in temperature of the air leaving the drier and controls said air escape and fresh air admission means so adjusted as to regulate the humidity of the air entering the drier and to maintain a substantially fixed drop in temperature between the air entering and leaving the drier.

12. The combination with a drier, of a supply fan for supplying air to the drier, an exhaust fan and connections for exhausting air from the drier and returning it to said supply fan, a heater for the air supplied to the drier, a thermostat controlling said heater for maintaining a substantially constant temperature of the air entering the drier, a thermostat which responds to changes in temperature of the air leaving the drier, and means controlled by said last mentioned thermostat so adjusted as to regulate the humidity of the air entering the drier and to maintain a substantially fixed drop in temperature between the air entering and leaving the drier.

13. The hereindescribed method of controlling the drying action of traveling surface liquid driers in which the rate of travel of the drying surface, the supply of liquid to the surface and the temperature are substantially constant, comprising the following steps, circulating a substantially constant volume of air through the drier, heating the air which is supplied to the drier under the control of the temperature of the air entering the drier to maintain a substantially constant temperature of such entering air, and regulating the admission to the drier of fresh air, return air from the drier or a mixture of fresh and return air under the control of the temperature of the air leaving the drier so as to maintain a substantially fixed drop in temperature between the air entering and the air leaving the drier.

Witness my hand this 18th day of July, 1919.

E. P. HECKEL.

Witnesses:
L. L. LEWIS,
K. BERENSMANN.